United States Patent [19]

Ishii et al.

[11] Patent Number: 5,086,366
[45] Date of Patent: Feb. 4, 1992

[54] PREALARM CIRCUIT BREAKER

[75] Inventors: Kazuhiro Ishii; Kouji Hirotsune; Ichiro Arinobu; Kazushi Sato, all of Fukuyama, Japan

[73] Assignee: Mitsubishi Denki Kabushiki Kaisha, Tokyo, Japan

[21] Appl. No.: 669,459

[22] Filed: Mar. 14, 1991

[30] Foreign Application Priority Data

Mar. 16, 1990 [JP] Japan ............................. 2-64138

[51] Int. Cl.⁵ .............................................. H02H 3/08
[52] U.S. Cl. ........................................ 361/94; 361/97; 340/664
[58] Field of Search .................. 361/94, 97, 98, 28; 340/664

[56] References Cited

U.S. PATENT DOCUMENTS 4,752,853  6/1988  Matsko ................................. 361/94
4,866,558  9/1989  Ishii ................................. 361/94 X

FOREIGN PATENT DOCUMENTS

1-231619  9/1989  Japan .

Primary Examiner—Todd E. DeBoer
Attorney, Agent, or Firm—Burns, Doane, Swecker & Mathis

[57] ABSTRACT

In a prealarm circuit breaker which can issue a prealarm signal before occurrence of trip, a pair-transistor is employed in a charging circuit of a pair of capacitors, one of which serves to make a time delay after pickup of an overcurrent and the other of which serves to make a time delay pickup of a current of prealarm level.

2 Claims, 9 Drawing Sheets

PREALARM CIRCUIT BREAKER

FIELD OF THE INVENTION AND RELATED ART STATEMENT

1. Field of the Invention

The present invention relates to a prealarm circuit breaker which has an overcurrent trip apparatus and a prealarm apparatus for issuing a prealarm signal before occurrence of trip.

2. Description of the Related Art

Figure 6:
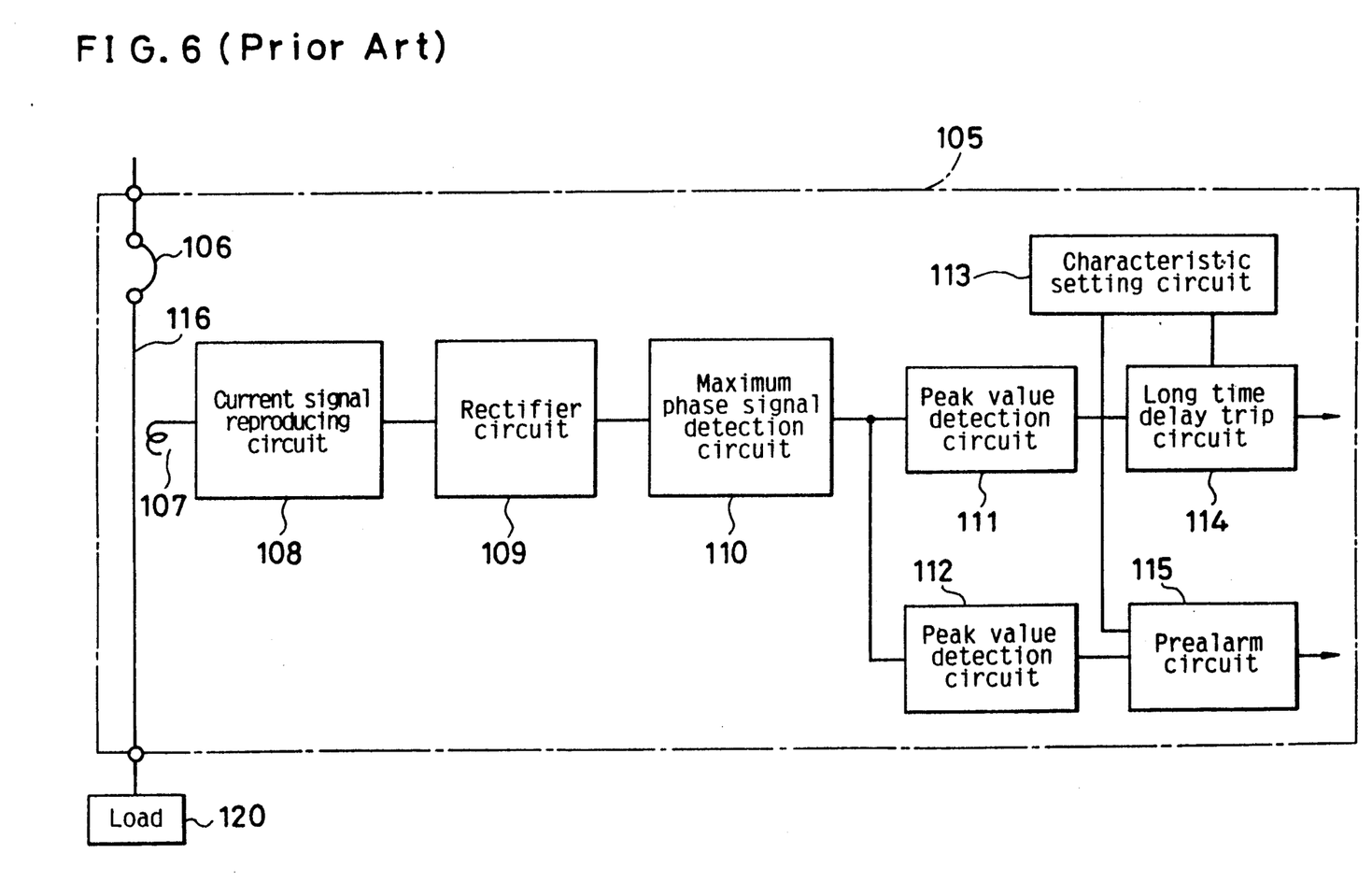
FIG. 6 is a block diagram showing the conventional prealarm circuit breaker.

FIG. 6 is a block diagram showing a part of a conventional prealarm circuit breaker 105. In FIG. 6, A.C. power is supplied to a load 120 through a main contact 106 of the prealarm circuit breaker 105. A current flowing through an internal electric line 116 in the prealarm circuit breaker 105 is detected by an air-core coil 107 connected to the electric line 116. A current signal reproducing circuit 108, which is connected to the air-core coil 107, reproduces current signals in response to output signals of the air-core coil 107. A rectifier circuit 109 rectifies the current signals reproduced in the current signal reproducing circuit 108. A maximum phase signal detection circuit 110 selects the maximum one of rectified signals of respective phases. Each of a pair of peak value detection circuits 111 and 112 converts the maximum rectified signal into a peak value to be detected. When this peak value exceeds a value specified by a predetermined prealarm characteristic in the prealarm circuit 115, a prealarm is issued from the prealarm circuit 115 to thereby light an alarm lamp (not shown) etc. Further, when the peak value exceeds a value specified by a predetermined long time delay trip characteristic in the long time delay trip circuit 114, a trip signal is issued from the long time delay trip circuit 114. The main contact 106 is thereby driven to open itself via a trip mechanism (not shown). The above-mentioned predetermined characteristics are set by a characteristic setting circuit 113.

Figure 7:
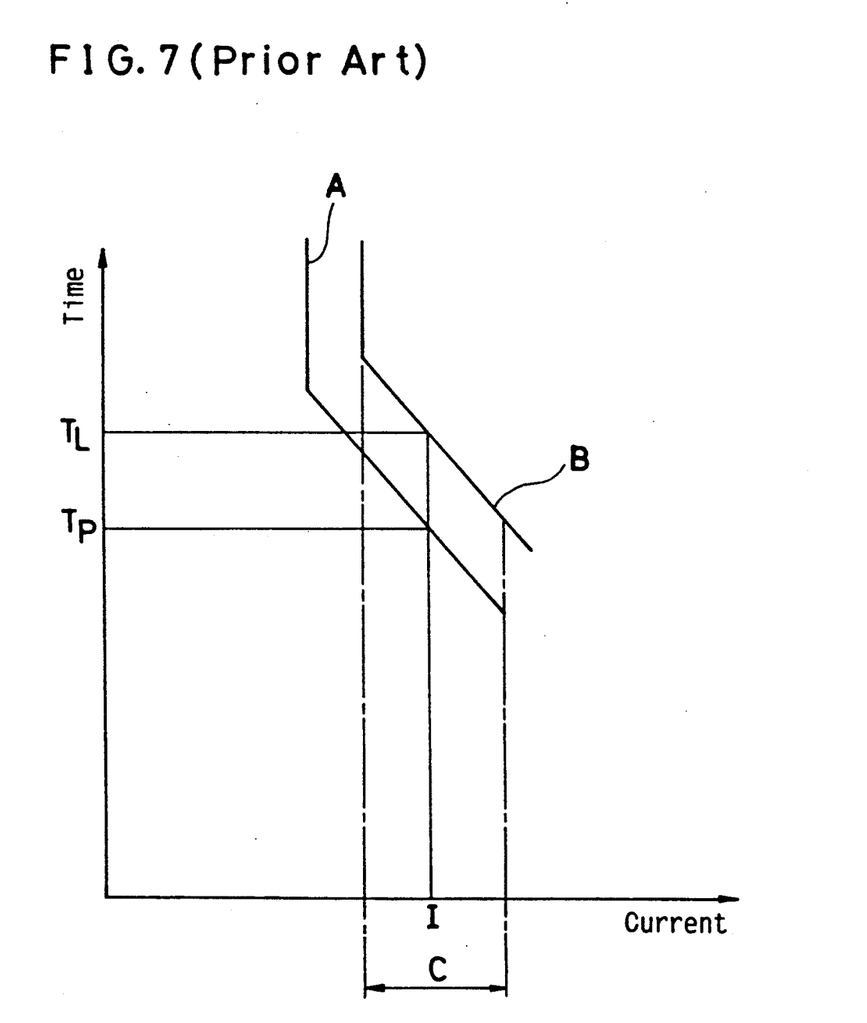
FIG. 7 is a graph showing time-current characteristic curves of the conventional prealarm circuit breaker.

FIG. 7 is a graph showing curves of the above-mentioned characteristics. A curve "A" represents the prealarm characteristic, and a curve "B" represents the long time delay trip characteristic. When an overcurrent of a current value I flows in the prealarm circuit breaker 105, the prealarm is issured with a delay time $T_p$ from the time of generation of overcurrent, whereas the trip signal is issued with a delay time $T_L$ from the same time as aforementioned.

However, as a matter of fact, two curves A and B are not always just as the graph shows. In a current range C, it is especially difficult to keep such a relation that the two curves A and B are located in parallel with each other. In other words, it is difficult to make a ratio of $T_L$ to $T_p$ constant at any current in the current range C. Further, in some cases the curves A and B may happen to cross with each other, thereby resulting in an undesirable state that antecedence of the curve A to the curve B in the time range is upset within the current range C. If the curve A is located over (in the upper side in FIG. 7 of) the curve B, trip action occurs before the prealarm is issued.

OBJECT AND SUMMARY OF THE INVENTION

An object of the present invention is to offer a prealarm circuit breaker in which a long time delay trip characteristic and a prealarm characteristic are well matched in a time-current characteristic in a manner such that curves of both characteristics are substantially in parallel with each other within a predetermined current range.

In order to achieve the above-mentioned object, the prealarm circuit breaker of the present invention comprises:

a pair-transistor having a pair of transistors;

current detection means for making a detection voltage responding to a current flowing through the prealarm circuit breaker;

voltage applying means for operating the pair-transistor in response to the detection voltage;

a pair of resistors which are connected in series to the transistors, respectively;

trip signal generation means connected in series to one of the transistors, the trip signal generation means issuing a trip signal with a predetermined delay time when the detection voltage exceeds a predetermined pickup voltage for trip; and prealarm signal generation means connected in series to the other one of the transistors, the signal generation means issuing the prealarm signal with a predetermined delay time when the detection voltage exceeds a predetermined pickup voltage for prealarm.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention is described with reference to the accompanying drawings.

Figure 1:
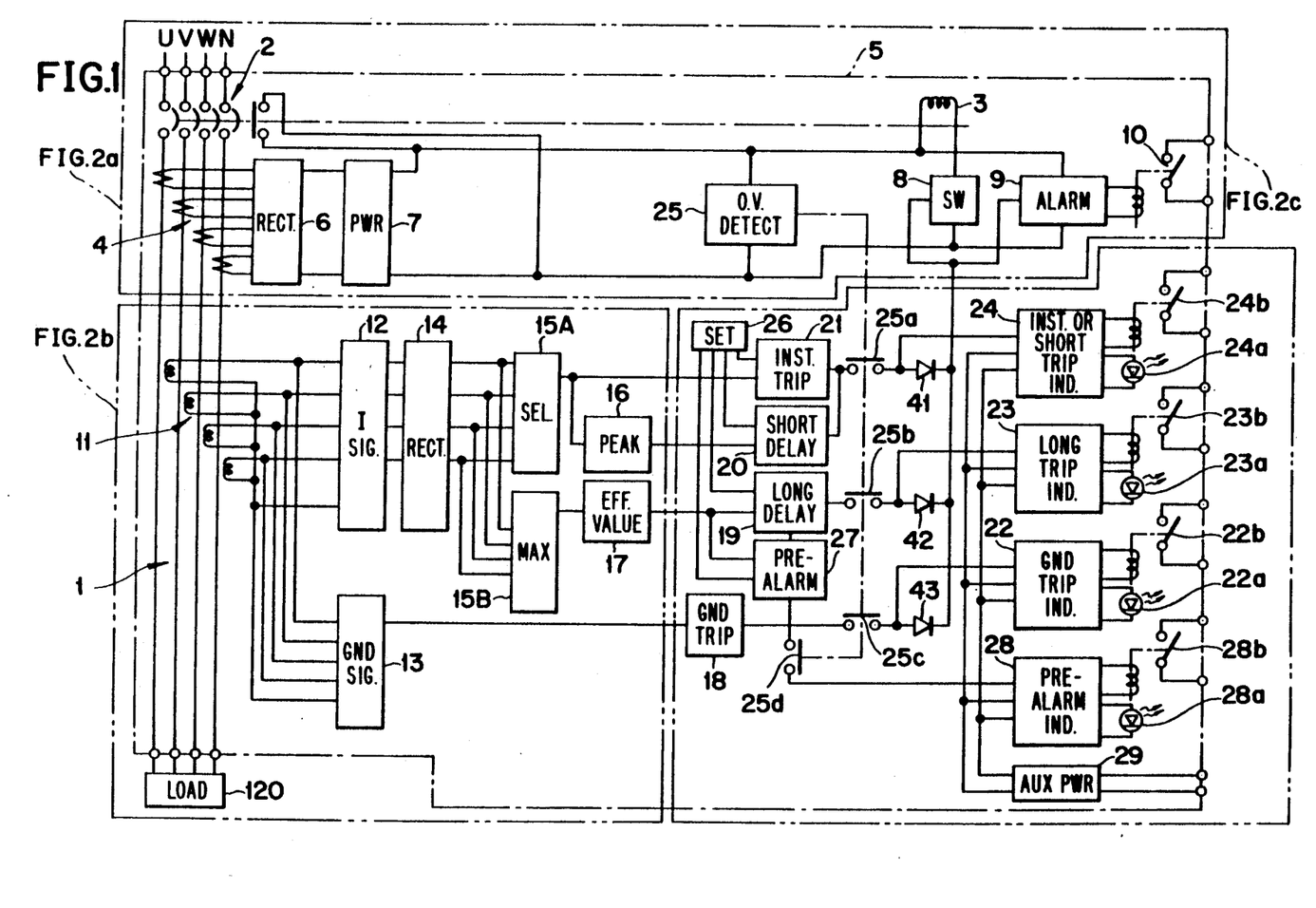
FIG. 1 is a block diagram showing a prealarm circuit breaker 5.
Figure 2A:
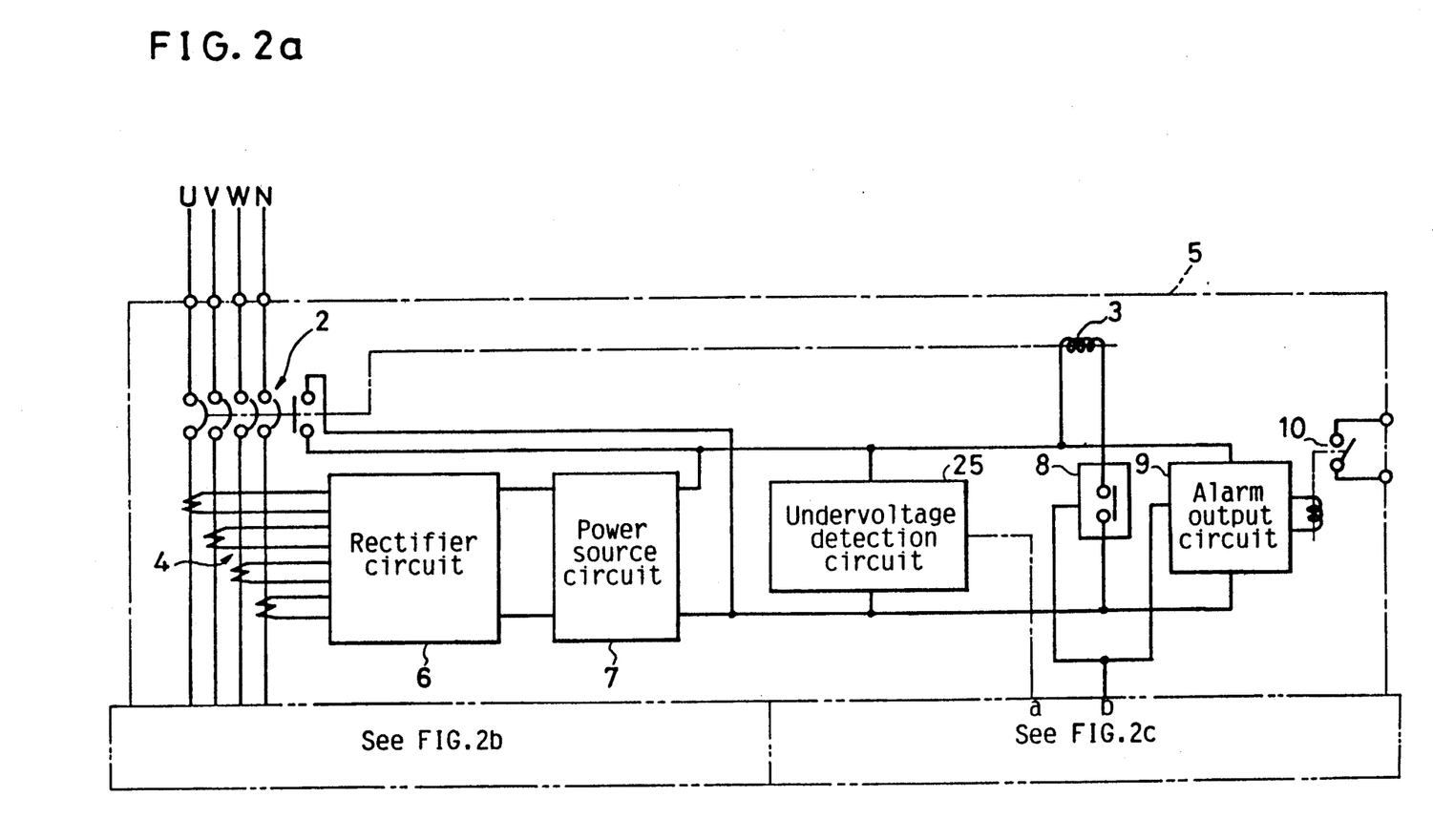
FIGS. 2a, 2b and 2c are combination views with each other and constitute the same block diagram as FIG. 1.
Figure 2B:
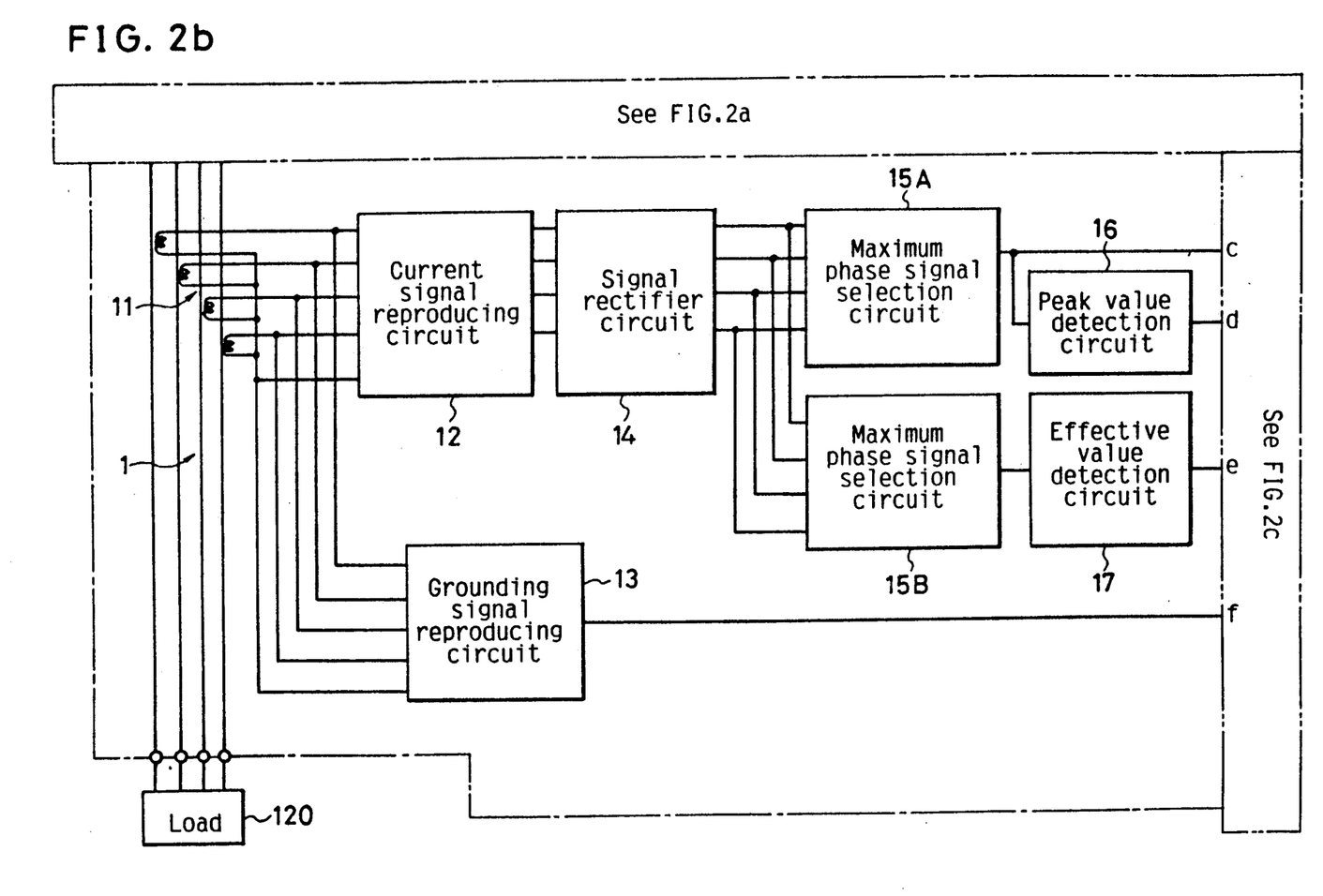
Figure 2C:
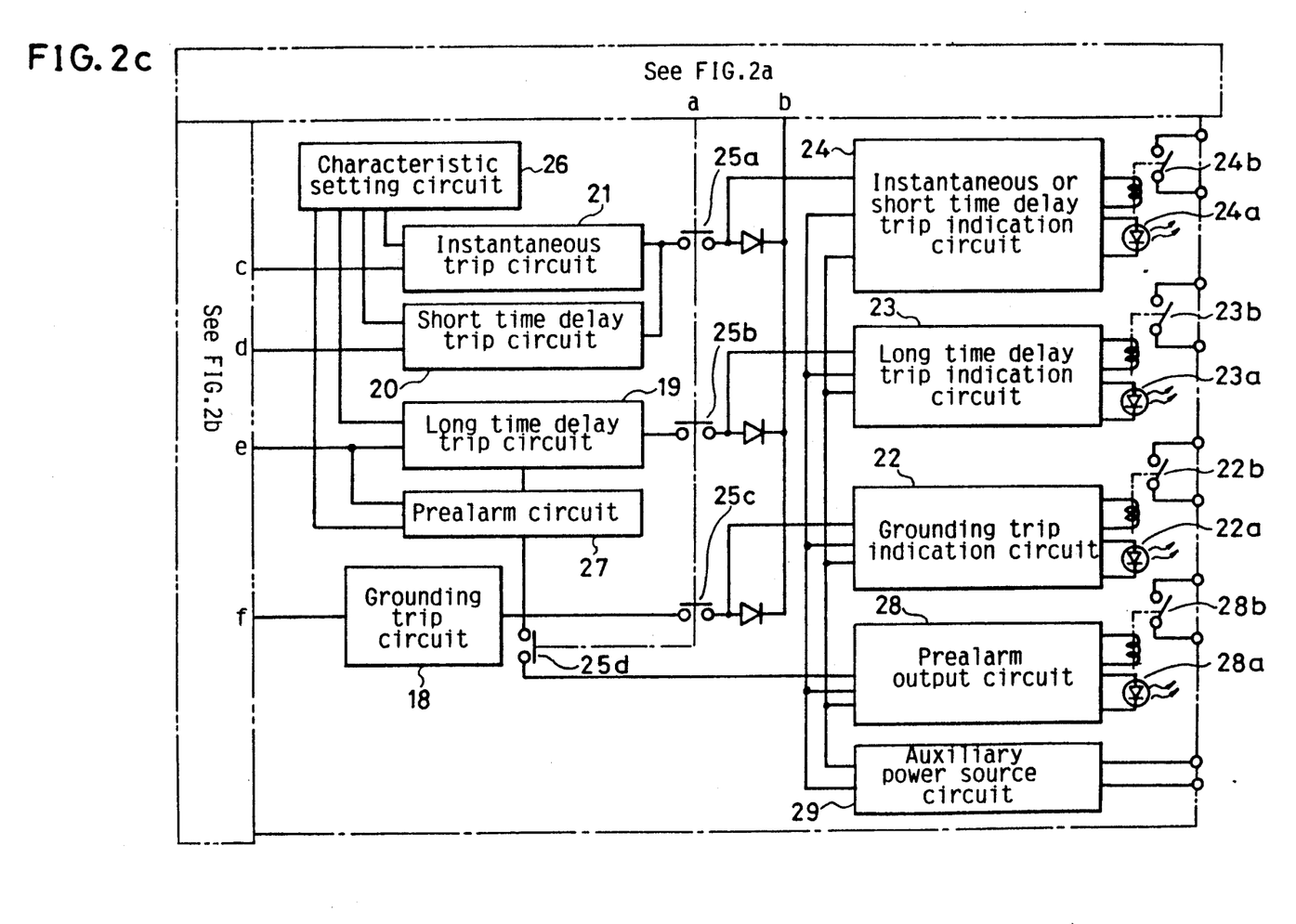

FIG. 1 is a block diagram showing the whole configuration of a prealarm circuit breaker 5. FIGS. 2a, 2b and 2c are combination views each showing detailed configurations of respective parts of the block diagram as FIG. 1. An A.C. power source (not shown) and a load 120 are electrically connected via a main contact 2 and a main circuit conductor 1 for four phases (U,V,W,N). The main contact 2 is opened by a trip coil 3 via a trip mechanism (not shown). Respective phase currents flowing through the main circuit conductor 1 are extracted by four current transformers 4. Output currents of the current transformers 4 are converted into a D.C. voltage by means of a rectifier circuit 6. A power source circuit 7 receives this D.C. voltage and supplies a predetermined voltage to several circuits which will be mentioned later. A solid state switch 8 is connected in series to the trip coil 3 so that the D.C. voltage supplied from the power source circuit 7 is applied to the trip coil 3 through the switch 8. An alarm output circuit 9, which receives the D.C. voltage from the power source circuit 7, issues an alarm signal in response to a trip signal inputted through each of diodes 41, 42 and 43. An alarm output relay 10 is closed/opened in response to operation of the alarm output circuit 9.

Four air-core coils 11 are electromagnetically connected to the main circuit conductor 1. A current signal reproducing circuit 12, which is connected to the air-core coils 11, reproduces current signals (voltage) in response to output signals of the air-core coils 11. A grounding signal reproducing circuit 13 is connected to the air-core coils 11 in parallel with the current signal reproducing circuit 12. This grounding signal reproducing circuit 13 reproduces a grounding signal in response to a real grounding current flowing through the main circuit conductor 1.

The current signals reproduced in the current signal reproducing circuit 12 are rectified by a signal rectifier circuit 14. A maximum phase signal selection circuit 15A selects the maximum instantaneous value of rectified signals of respective phases. A maximum phase signal selection circuit 15B selects one phase signal, which contains the largest signal within a predetermined time interval, from among respective phase signals. A peak value detection circuit 16 receives the maximum rectified signal from the maximum phase signal detection circuit 15A and converts it into a peak value to be detected. An effective value detection circuit 17 receives the maximum rectified signal from the maximum phase signal detection circuit 15B and converts it into an effective value (root-mean-square value) to be detected.

A grounding trip circuit 18 issues a trip signal when the grounding signal reproduced in the grounding signal reproducing circuit 13 exceeds a value specified by a predetermined grounding trip characteristic stored in the grounding trip circuit 18. A long time delay trip circuit 19 issues a trip signal when the effective value, namely a detection voltage of the effective value detection circuit 17, exceeds a value specified by a predetermined long time delay trip characteristic. A short time delay trip circuit 20 issues a trip signal when the peak value detected in the peak value detection circuit 16 exceeds a value specified by a predetermined short time delay trip characteristic. An instantaneous trip circuit 21 issues a trip signal when the maximum rectified signal issued from the maximum phase selection circuit 15A exceeds a value specified by a predetermined instantaneous trip characteristic. A grounding trip indication circuit 22 is operated by the trip signal issued from the grounding trip circuit 18, thereby lighting an LED 22a and closing a contact 22b. A long time delay trip indication circuit 23 is operated by the trip signal issued from the long time delay trip circuit 19, thereby lighting an LED 23a and closing a contact 23b. An instantaneous or short time delay trip indication circuit 24 is operated by the trip signal issued from the short time delay trip circuit 20 or the instantaneous trip circuit 21, thereby lighting an LED 24a and closing a contact 24b.

A prealarm circuit 27, which is connected to the long time delay trip circuit 19 and the effective value detection circuit 17, issues a prealarm signal when the detection voltage of the effective value detection circuit 17 exceeds a value specified by a predetermined prealarm characteristic. A prealarm output circuit 28 is operated by the prealarm signal issued from the prealarm circuit 27, thereby lighting an LED 28a and closing a contact 28b. Power source for three indication circuits 22-24 and the prealarm output circuit 28 is supplied by an auxiliary power source circuit 29.

Figure 3:
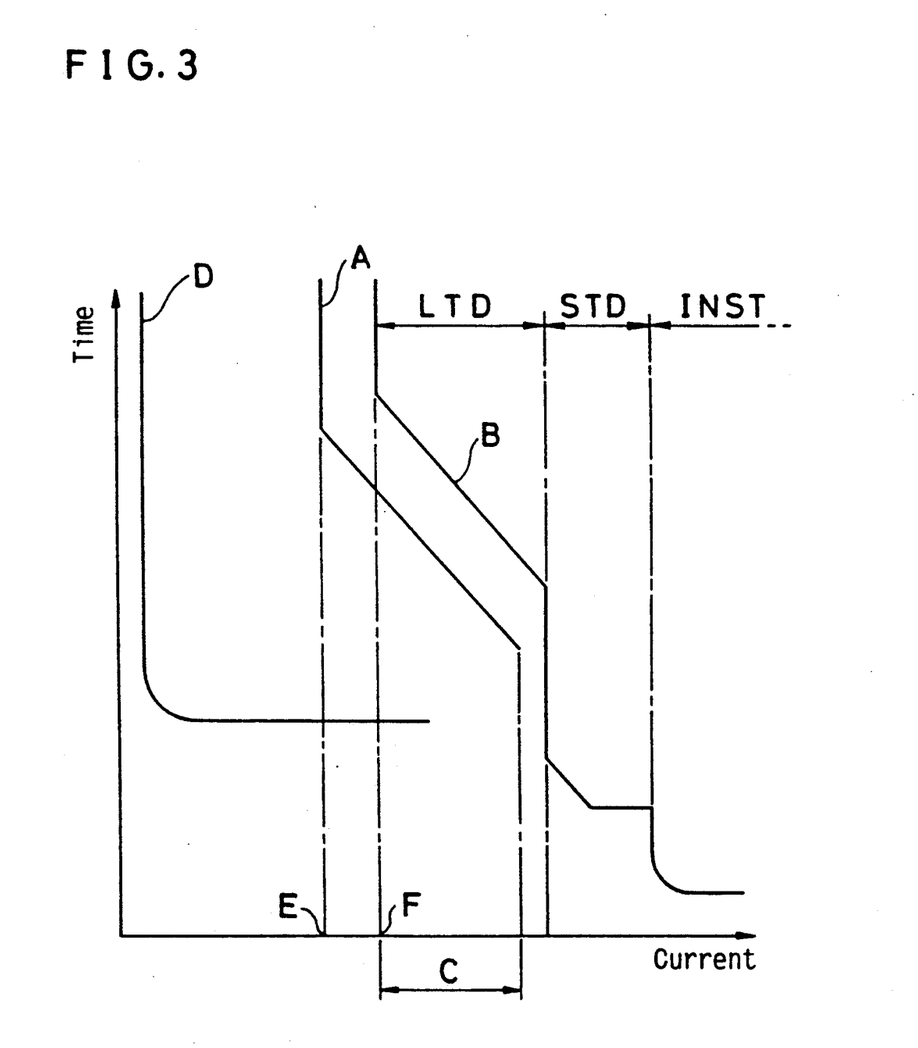
FIG. 3 is a graph showing time-current characteristic curves of the prealarm circuit breaker.

The above-mentioned predetermined characteristics of long time delay, short time delay, instantaneous and prealarm are set by a characteristic setting circuit 26. Curves of these characteristics are shown in FIG. 3. A characteristic curve D represents the grounding trip characteristic, and a characteristic curve A represents the prealarm characteristic. A characteristic curve B consists of three characteristics in response to degree of overcurrent. That is, the long time delay trip characteristic is located in a current range of "LTD", and the short time delay trip characteristic is located in a current range of "STD". Further, the instantaneous trip characteristic is located in a current range of "INST".

In FIG. 1, an undervoltage detection circuit 25 is connected in parallel with the power source circuit 7 in order to always monitor an output voltage of the power source circuit 7. Output contacts 25a, 25b, 25c and 25d of the undervoltage detection circuit 25 are connected in series to output ends of the instantaneous trip circuit 21 (or the short time delay trip circuit 20), the long time delay trip circuit 19, the grounding trip circuit 18 and the prealarm circuit 27, respectively.

In the above-mentioned prealarm circuit breaker 5, when the output voltage of the power source circuit 7 is normal, all the output contacts 25a, 25b, 25c and 25d are closed. In this state, when the trip signal is issued from the trip circuit 18, 19, 20 or 21, the solid state switch 8 is closed. The trip coil 3 is thereby excited, and the main contact 2 is opened. Thus, the prealarm circuit breaker 5 falls in a trip state.

When the prealarm signal is issued from the prealarm circuit 27 before the trip signal is issued, the prealarm output circuit 28 lights the LED 28a and closes the contact 28b in order to inform an operator of occurrence of prealarm state.

Figure 4:
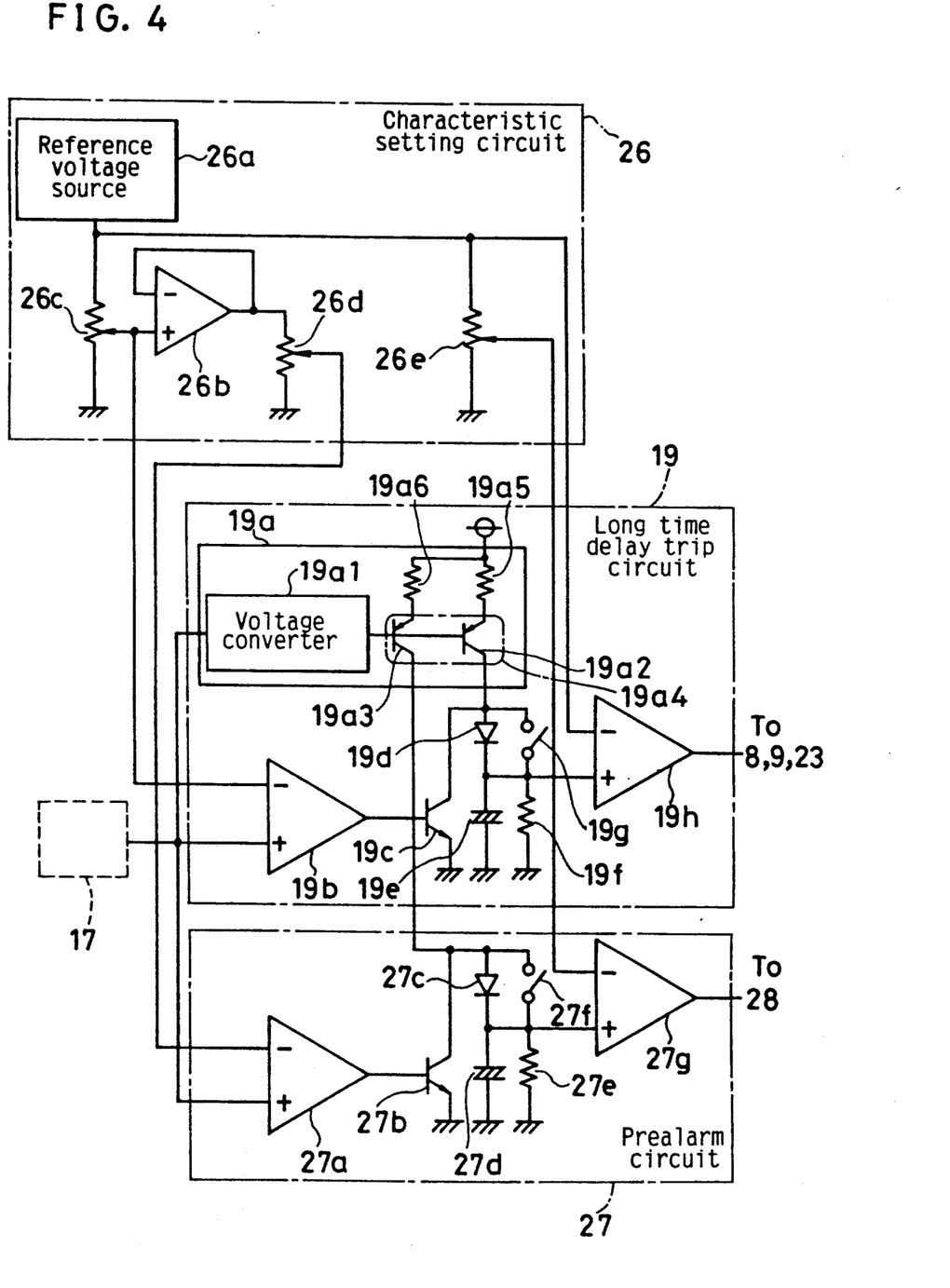
FIG. 4 is a circuit diagram showing a main part of the prealarm circuit breaker of the present invention.

Next, a main part of the embodiment is described. FIG. 4 is a circuit diagram showing internal circuits of the characteristic setting circuit 26, the long time delay trip circuit 19 and the prealarm circuit 27.

The characteristic setting circuit 26 includes a reference voltage source 26a, a buffer amplifier 26b of amplification factor 1 and variable resistors 26c, 26d, 26e. The variable resistor 26c is provided between the reference voltage source 26a and the earth, and a slidable terminal of the variable resistor 26c is connected to a non-inverted terminal of the buffer amplifier 26b. An output terminal of the buffer amplifier 26b is connected to an inverted terminal of the same and is connected to the earth through the variable resistor 26d. The variable resistor 26e is provided between the reference voltage source 26a and the earth.

The long time delay trip circuit 19 includes a $V/I^2$ converter 19a, a comparator 19b, a transistor 19c, a diode 19d, a capacitor 19e, a discharge resistor 19f, a switch 19g and a comparator 19h. The $V/I^2$ converter 19a further includes voltage applying means such as a voltage converter 19a1, a pair-transistor 19a4 and resistors 19a5 and 19a6. The voltage converter 19a1 converts the detection voltage V into a voltage $V^2$. The pair-transistor 19a4 consists of a pair of transistors 19a2 and 19a3. A base of the pair-transistor 19a4 is connected to a $V^2$ output end of the voltage converter 19a1. The resistors 19a5 and 19a6 are provided between emitters of the transistors 19a2, 19a3 and the power source, respectively. The collector of the transistor 19a2 is grounded through the collector to emitter circuit of the transistor 19c and is also grounded via the diode 19d and the capacitor 19e. Furthermore, the collector of the transistor 19a2 is connected to the earth via the switch 19g and the resistor 19f. A non-inverted input terminal of the comparator 19b is impressed with the aforementioned detection voltage V, and an inverted input terminal of the comparator 19b is impressed with a reference voltage for picking up the signal of long time delay trip level. This reference voltage is supplied from the slidable terminal of the variable resistor 26c. An output terminal of the comparator 19b is connected to a base of the transistor 19c, thereby normally keeping the transistor 19c on. A connection point of the diode 19d with the capacitor 19e and a connection point of the switch 19g with the resistor 19f are both connected to a non-inverted input terminal of the comparator 19h. An inverted input terminal of the comparator 19h is connected to an output terminal of the reference voltage source 26a.

The prealarm circuit 27 includes a comparator 27a, a transistor 27b, a diode 27c, a capacitor 27d, a discharge resistor 27e, a switch 27f and a comparator 27g. The collector of the transistor 19a3 is grounded through the collector to emitter circuit of the transistor 27b and is also grounded via the diode 27c and the capacitor 27d. Furthermore, the collector of the transistor 19a3 is connected to the earth via the switch 27f and the resistor 27e. A non-inverted input terminal of the comparator 27a is impressed with the detection voltage V, and an inverted input terminal of the comparator 27a is impressed with a reference voltage for picking up the signal of prealarm level. This reference voltage is supplied from a slidable terminal of the variable resistor 26d. An output terminal of the comparator 27a is connected to a base of the transistor 27b, thereby normally keeping the transistor 27a on. A connection point of the diode 27c with the capacitor 27d and a connection point of the switch 27f with the resistor 27e are both connected to a non-inverted input terminal of the comparator 27g. An inverted input terminal of the comparator 27g is connected to a slidable terminal of the variable resistor 26e.

In the above-mentioned prealarm circuit breaker, when a normal current flows in the main circuit conductor 1, the detection voltage V corresponding to this normal current is converted into the voltage $V^2$ in the voltage converter 19a1. The pair-transistor 19a4 is thereby operated. Since the detection voltage V is lower than the reference voltages inputted to the respective comparators 19b and 27a, both the transistors 19c and 27b are turned on. As a result, collector currents ($I^2$) of the pair-transistor 19a4 flow in the transistors 19c and 27b to the earth. Therefore, the prealarm circuit 27 generates no alarm signal, and the long time delay trip circuit 19 generates no trip signal.

When a large current E (FIG. 3) flows in the main circuit conductor 1 and thereby the detection voltage V corresponding to this current exceeds the reference voltage of the comparator 27a, the transistor 27b is turned off in accordance with change of an output signal of the comparator 27a. Therefore, the collector current ($I^2$) of one of the transistor 19a3 of the pair-transistor 19a4 flows in the diode 27c and the capacitor 27d. When a charging voltage of the capacitor 27d exceeds the reference voltage given to the comparator 27g from the variable resistor 26e, the comparator 27g issues the prealarm signal.

When a further large current F (FIG. 3) flows in the main circuit conductor 1 and thereby the detection voltage V corresponding to this current exceeds the reference voltage given to the comparator 19b, the transistor 19c is turned off in accordance with change of an output signal of the comparator 19b. Therefore, the collector current ($I^2$) of one of the transistor 19a2 of the pair-transistor 19a4 flows in the diode 19d and the capacitor 19e. When a charging voltage of the capacitor 19e exceeds the reference voltage given to the comparator 19h, the comparator 19h issues a trip signal.

To the contrary, when the current flowing in the main circuit conductor 1 drops below the current F (FIG. 3) and thereby the charging voltage of the capacitor 19e does not reach the reference voltage of the comparator 19h, the comparator 19h does not issue the trip signal. When the current flowing in the main circuit conductor 1 drops below the current E (FIG. 3) and thereby the charging voltage of the capacitor 27d drops below the reference voltage of the comparator 27g, the comparator 27g does not issue the prealarm signal. The charging voltages of the capacitors 19e and 27d are discharged through the discharge resistors 19f and 27e, respectively. At that time, both the transistors 19c and 27b have been already on-state. When the switches 19g and 27f are closed, the capacitors 19c and 27d are quickly discharged through the transistors 19c and 27b, respectively. These switches 19g and 27b are used to select a cooling simulation mode for the load 120 (FIG. 1) or cables etc.

Figure 5:
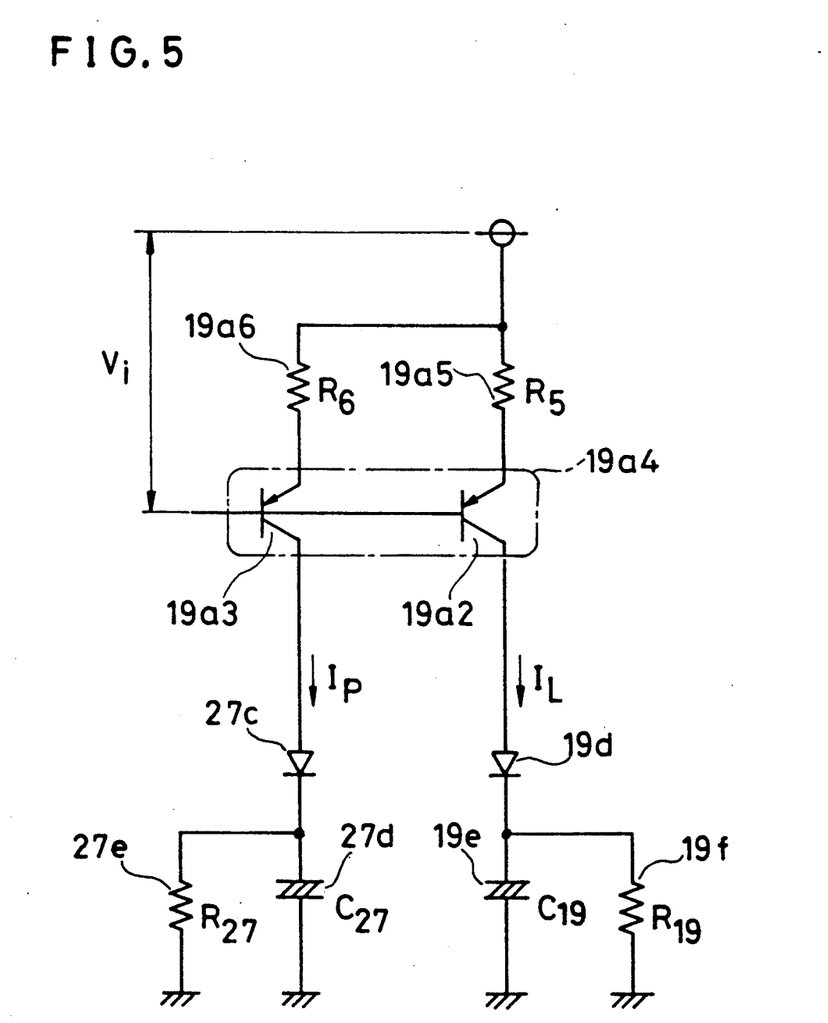
FIG. 5 is a circuit diagram showing a part of FIG. 4.

Next, operation of the pair-transistor 19a4 is described in detail. FIG. 5 is a circuit diagram showing only the pair-transistor 19a4 and a pair of charging circuit which have been shown in FIG. 4.

In FIG. 5, an input voltage $V_i$ of the pair-transistor 19a4, which is dependent on the output voltage $V^2$ of the voltage converter 19a1, is represented as follows:

$$V_i = V_{3BE} + R_6 \times I_P \qquad (1)$$

$$V_i = V_{2BE} + R_5 \times I_L \qquad (2)$$

wherein
$V_{3BE}$: base-emitter voltage of the transistor 19a3,
$V_{2BE}$: base-emitter voltage of the transistor 19a2,
$R_6$: resistance of the resistor 19a6,
$R_5$: resistance of the resistor 19a5,
$I_P$: collector current of the transistor 19a3, and
$I_L$: collector current of the transistor 19a2.

Since characteristics of the transistors 19a3 and 19a2 are just like each other, the base-emitter voltages $V_{3BE}$ and $V_{2BE}$ are substantially equal to each other. Therefore, the following equation is obtained from the equations (1) and (2):

$$R_6 \times I_P = R_5 \times I_L$$

Therefore, the collector current $I_P$ is represented by an equation:

$$I_P = (R_5/R_6) \times I_L \qquad (3).$$

In a transient state of the charging of the capacitor 19e, a terminal voltage V of the capacitor 19e is generally represented by an equation:

$$V = I_L \cdot R_{19} \cdot (1 - \exp(-t/\tau)) \qquad (4),$$

wherein
$R_{19}$: resistance of the resistor 19f,
t: time, and
$\tau$: time constant.

By solving the above-mentioned equation (4) with respect to the time t, the following equation is obtained:

$$t = -\tau \cdot \log_e \left(1 - \frac{V}{I_L \cdot R_{19}}\right). \qquad (5)$$

Herein, since a value of $(V/(I_L \cdot R_{19}))$ is generally very much smaller than 1, the following equation is obtainable:

$$t \approx \tau \cdot V/(I_L \cdot R_{19}) = C_{19} \cdot R_{19} \cdot V/(I_L \cdot R_{19}) = C_{19} \cdot V/I_L \qquad (6),$$

wherein $C_{19}$ designates a capacitance of the capacitor 19e.

In the similar way, the following equations are obtained with respect to the transient state of charging of the capacitor 27d. That is:

$$t \approx C_{27} \cdot V/I_P \qquad (7),$$

wherein $C_{27}$ designates a capacitance of the capacitor 27d.

Therefore, a delay time $T_L$ by when the terminal voltage of the capacitor 19e reaches a specific voltage $V_L$ is represented by an equation:

$$T_L \approx C_{19} \cdot V_L / I_L \qquad (6').$$

Also, a delay time $T_P$ by when the terminal voltage of the capacitor 27d reaches the voltage $V_L$ is represented by an equation:

$$T_P \approx C_{27} \cdot V_L / I_P \qquad (7').$$

Therefore, a ratio of $T_P$ to $T_L$ is represented as follows:

$$T_P/T_L = (C_{27}/C_{19}) \cdot (I_L/I_P) \qquad (8).$$

This equation (8) can be transformed by using the equation (3) into an equation:

$$T_P/T_L = (C_{27}/C_{19}) \cdot (R_6/R_5) \qquad (9).$$

This equation teaches that the ratio of time of the prealarm to the long time delay trip is dependent on a ratio of emitter resistance for the transistor 19a6 to the transistor 19a5 and a ratio of capacitance of the capacitors 27d and 19e. Since these ratio are fixed and reliable, the value of $T_P/T_L$ is always kept constant. As a result, the characteristic curves 1 and 2 are in parallel with each other within a current range C(FIG. 3).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A prealarm circuit breaker, which has an overcurrent trip apparatus and a prealarm apparatus for issuing a prealarm signal before occurrence of trip, comprising:
   a pair-transistor having a pair of transistors;
   current detection means for making a detection voltage responding to a current flowing through said prealarm circuit breaker;
   voltage applying means for operating said pair-transistor in response to said detection voltage;
   a pair of resistors which are connected in series to said transistors, respectively;
   trip signal generation means connected in series to one of said transistors, said trip signal generation means issuing a trip signal with a predetermined delay time when said detection voltage exceeds a predetermined pickup voltage for trip; and
   prealarm signal generation means connected in series to the other one of said transistors, said signal generation means issuing the prealarm signal with a predetermined delay time when said detection voltage exceeds a predetermined pickup voltage for prealarm.

2. A prealarm circuit breaker in accordance with claim 1, wherein
   each of said predetermined delay times is dependent on a time for charging a capacitor through each of said transistors and each of said resistors.

* * * * *

UNITED STATES PATENT AND TRADEMARK OFFICE
CERTIFICATE OF CORRECTION

PATENT NO. : 5,086,366
DATED : February 4, 1992
INVENTOR(S) : Kazuhiro ISHII et al.

It is certified that error appears in the above-identified patent and that said Letters Patent is hereby corrected as shown below:

In the drawings, Fig. 1:

Box 25 should read --U.V. DETECT--; and

Signed and Sealed this

Twenty-eighth Day of September, 1993

Attest:

BRUCE LEHMAN

Attesting Officer

Commissioner of Patents and Trademarks